(12) United States Patent
Uematsu et al.

(10) Patent No.: US 10,591,031 B2
(45) Date of Patent: Mar. 17, 2020

(54) ELECTRIC ACTUATOR

(71) Applicant: Nidec Tosok Corporation, Zama-shi, Kanagawa (JP)

(72) Inventors: Yutaka Uematsu, Zama (JP); Shuichi Kinjo, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 296 days.

(21) Appl. No.: 15/886,885

(22) Filed: Feb. 2, 2018

(65) Prior Publication Data

US 2018/0223973 A1 Aug. 9, 2018

(30) Foreign Application Priority Data

Feb. 3, 2017 (JP) .................. 2017-018628

(51) Int. Cl.
| | |
|---|---|
| *H02K 11/21* | (2016.01) |
| *F16H 25/20* | (2006.01) |
| *F16H 61/26* | (2006.01) |
| *H02K 7/06* | (2006.01) |
| *H02K 5/173* | (2006.01) |

(Continued)

(52) U.S. Cl.
CPC ....... *F16H 25/2015* (2013.01); *F16H 59/105* (2013.01); *F16H 61/12* (2013.01); *F16H 61/26* (2013.01); *H02K 5/1732* (2013.01); *H02K 7/06* (2013.01); *H02K 7/116* (2013.01); *H02K 11/21* (2016.01); *H02K 11/215* (2016.01); *F16H 2001/325* (2013.01); *F16H 2025/2031* (2013.01); *F16H 2061/326* (2013.01); *H02K 5/225* (2013.01)

(58) Field of Classification Search
CPC ........ F16H 25/20; F16H 61/26; F16H 59/105; F16H 61/12; F16H 25/2015; F16H 2061/326; F16H 2001/325; F16H 2025/2031; H02K 11/21; H02K 7/06; H02K 5/1732; H02K 7/116; H02K 11/215; H02K 5/225
See application file for complete search history.

(56) References Cited

U.S. PATENT DOCUMENTS

| | | | |
|---|---|---|---|
| 6,701,803 B1 * | 3/2004 | Tamai | F16H 49/001 74/640 |
| 2002/0135241 A1 * | 9/2002 | Kobayashi | F16H 49/001 310/20 |
| 2011/0116962 A1 * | 5/2011 | Kanayama | H02K 7/003 418/191 |

FOREIGN PATENT DOCUMENTS

| | | |
|---|---|---|
| JP | 2001-112215 A | 4/2001 |
| JP | 2006-166603 A | 6/2006 |
| JP | 2015-087118 A | 5/2015 |

* cited by examiner

*Primary Examiner* — Naishadh N Desai
(74) *Attorney, Agent, or Firm* — Keating & Bennett (57) ABSTRACT

There is provided an electric actuator including: a motor that has a motor shaft, a speed reduction mechanism, an output portion that has an output shaft portion, a rotation detection device, and a first bearing. The output shaft portion extends in an axial direction and is disposed on one side in the axial direction of the motor shaft. The output portion has a first recessed portion recessed from the other side to the one side in the axial direction. An end portion of the motor shaft on the one side in the axial direction is accommodated in the first recessed portion. The first bearing is fixed to an inside surface of the first recessed portion in a radial direction. At least a portion of the rotation detection device is disposed at a position overlapping the first recessed portion in the radial direction.

14 Claims, 2 Drawing Sheets

(51) Int. Cl.
*H02K 7/116* (2006.01)
*H02K 11/215* (2016.01)
*F16H 59/10* (2006.01)
*F16H 61/12* (2010.01)
*H02K 5/22* (2006.01)
*F16H 61/32* (2006.01)
*F16H 1/32* (2006.01)

ELECTRIC ACTUATOR

CROSS REFERENCE TO RELATED APPLICATIONS

This application claims the benefit of priority to Japanese Patent Application No. 2017-018628 filed on Feb. 3, 2017. The entire contents of this application are hereby incorporated herein by reference.

BACKGROUND OF THE INVENTION

1. Field of the Invention

The present invention relates to an electric actuator.

2. Description of the Related Art

An actuator including an electric motor and a speed reducer is known. For example, an actuator includes a rotational position detector that detects a rotational position of a rotation shaft of the electric motor.

Such an electric actuator is described, for example, in Japanese Unexamined Patent Application Publication No. 2001-112215.

In the actuator described above, for example, in a case where a trouble occurs in rotational power transmission between the electric motor and the speed reducer by a gear or the like, even if the rotational position of the rotation shaft is detected, there is a problem that detection accuracy of the rotational position of an output shaft of the speed reducer is reduced. For this reason, there may be a case that a trouble occurs in the driving force control of the actuator. To address this situation, for example, a configuration that separately provides a detector for detecting the rotational position of the output shaft of the speed reducer is considered. However, there is a problem that, if the detector is simply provided, the actuator becomes larger in the axial direction.

SUMMARY OF THE INVENTION

An object of the present invention is to provide an electric actuator having a structure that can precisely detect the rotation of an output portion and suppress an increase in size thereof.

According to one aspect of the present invention, there is provided an electric actuator including: a motor that has a motor shaft which extends in an axial direction, a speed reduction mechanism that is disposed on an outside of a portion of the motor shaft in a radial direction at one side in the axial direction and connected to the motor shaft, an output portion that has an output shaft portion to which rotation of the motor shaft is transmitted via the speed reduction mechanism, a rotation detection device that detects rotation of the output portion, and a first bearing that connects the motor shaft and the output portion to each other in a relatively rotatable manner, in which the output shaft portion extends in the axial direction and is disposed on the one side in the axial direction of the motor shaft, the output portion has a first recessed portion recessed from the other side in the axial direction to the one side in the axial direction, an end portion of the motor shaft on the one side in the axial direction is accommodated in the first recessed portion, the first bearing is fixed to an inside surface of the first recessed portion in the radial direction, and at least a portion of the rotation detection device is disposed at a position overlapping the first recessed portion in the radial direction.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
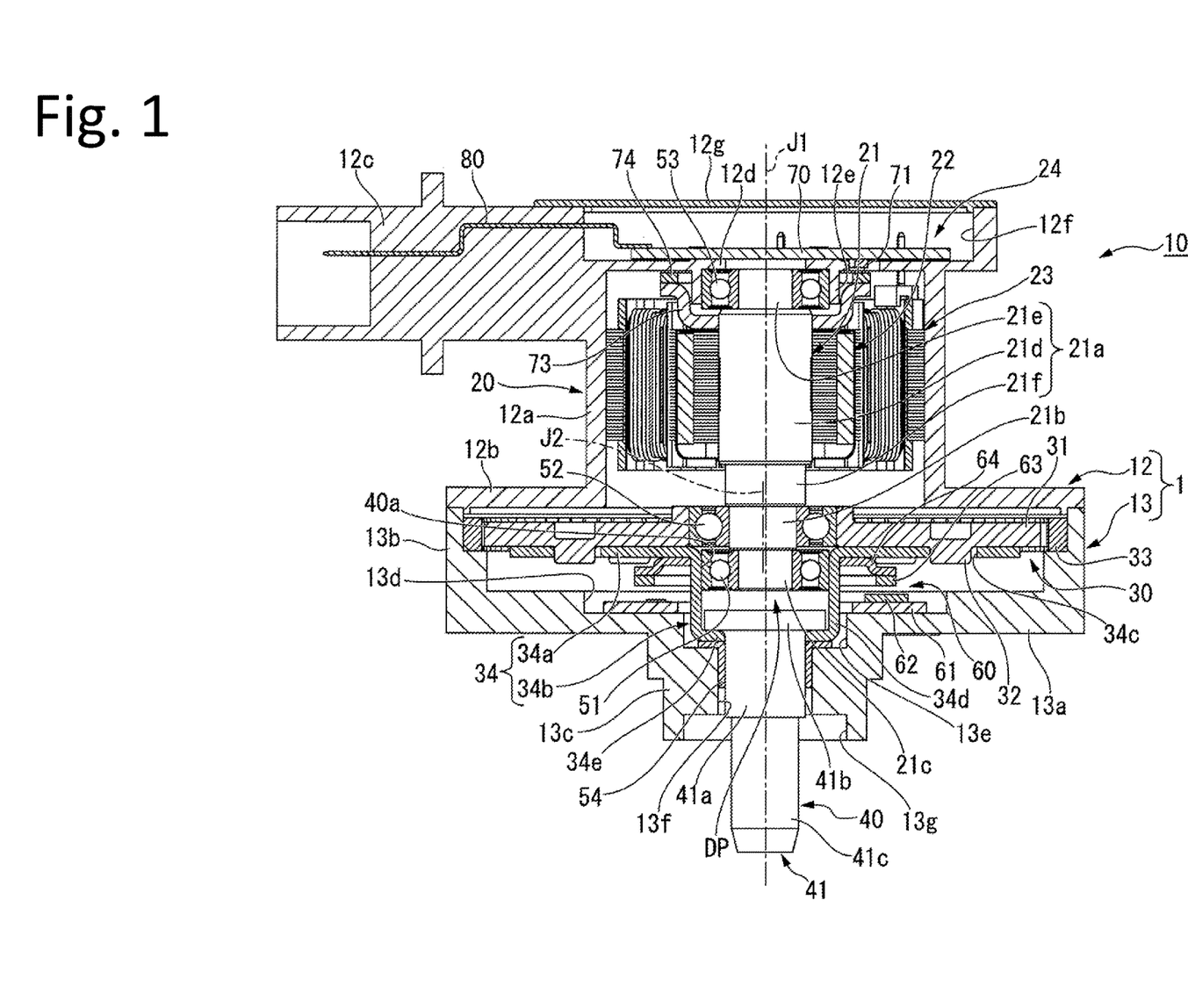
FIG. 1 is a sectional view illustrating an electric actuator according to this embodiment.

As illustrated in FIG. 1, an electric actuator 10 of this embodiment includes a case 11, a motor 20 that has a motor shaft 21 extending in an axial direction of a first central axis J1, a speed reduction mechanism 30, an output portion 40, a rotation detection device 60, a first bearing 51, a second bearing 52, a third bearing 53, and a bush 54. The first bearing 51, the second bearing 52, and the third bearing 53 are, for example, ball bearings. The axial direction of the first central axis J1 is parallel to the up-and-down direction.

In the following description, the axial direction of the first central axis J1 is simply referred to as an "axial direction", an upper side of FIG. 1 in the axial direction is simply referred to as an "upper side" and a lower side of FIG. 1 in the axial direction is simply referred to as a "lower side". In addition, a radial direction about the first central axis J1 is simply referred to as a "radial direction" and a peripheral direction about the first central axis J1 is simply referred to as a "peripheral direction". The upper side and the lower side are simply names for explaining the relative positional relationship among the respective portions, and the actual disposition relationship or the like may be a disposition relation or the like other than the disposition relationship or the like indicated by these names. The lower side corresponds to one side in the axial direction and the upper side corresponds to the other side in the axial direction.

The case 11 accommodates the motor 20 and the speed reduction mechanism 30. The case 11 includes a motor case 12 that accommodates the motor 20 and a speed reduction mechanism case 13 that accommodates the speed reduction mechanism 30. The motor case 12 has a case tubular portion 12a, an upper lid portion 12g, a case flange portion 12b, an annular plate portion 12d, a bearing holding portion 12e, and a connector portion 12c.

The case tubular portion 12a has a cylindrical shape extending in the axial direction about the first central axis J1. The case tubular portion 12a opens on both sides in the axial direction. The case tubular portion 12a surrounds the outside of the motor 20 in the radial direction. The portion of the case tubular portion 12a above the annular plate portion 12d is a control board accommodating portion 12f. The upper lid portion 12g is a plate-like lid for closing the upper end opening of the case tubular portion 12a, that is, the upper end opening of the control board accommodating portion 12f.

The case flange portion 12b has an annular plate shape expanding outside from the lower end portion of the case tubular portion 12a in the radial direction. The annular plate portion 12d has an annular plate shape expanding inward from the inner peripheral surface of the case tubular portion 12a in the radial direction. The annular plate portion 12d covers the upper side of a stator 23 of the motor 20 described below. The bearing holding portion 12e has a cylindrical shape protruding downward from a lower surface of the annular plate portion 12d. The bearing holding portion 12e opens downward about the first central axis J1. The third bearing 53 is fixed to and held on the inner peripheral surface of the bearing holding portion 12e. The connector portion 12c has a columnar shape extending outside from the outer peripheral surface in the radial direction at the upper end portion of the case tubular portion 12a. The connector portion 12c has a recessed portion recessed from the outer end portion in the radial direction to the inside in the radial direction. An external power supply (not illustrated) is connected to the connector portion 12c.

The speed reduction mechanism case 13 has a lid portion 13a, a tubular portion 13b, and a protruding tubular portion 13c. In other words, the case 11 has a lid portion 13a. The lid portion 13a has an annular plate shape about the first central axis J1. The outer end of the lid portion 13a in the radial direction is positioned outside the case tubular portion 12a in the radial direction. The lid portion 13a covers the speed reduction mechanism 30 from the lower side thereof. The lid portion 13a has a second recessed portion 13d recessed downward from the upper surface of the lid portion 13a. The second recessed portion 13d has an annular shape which extends in the peripheral direction.

The tubular portion 13b has a cylindrical shape protruding upward from the outer edge portion of the lid portion 13a in the radial direction. The upper end portion of the tubular portion 13b is in contact with and is fixed to the outer edge portion of the lower surface of the case flange portion 12b in the radial direction. The protruding tubular portion 13c has a cylindrical shape which protrudes downward from the inner edge portion of the lid portion 13a in the radial direction. The protruding tubular portion 13c opens downward.

The protruding tubular portion 13c has a first large diameter portion 13e, a small diameter portion 13f, and a second large diameter portion 13g in the inside thereof. The first large diameter portion 13e is the upper end portion inside the protruding tubular portion 13c and opens upward and is connected to the tubular portion 13b at the inside thereof. The small diameter portion 13f is connected to the lower end of the first large diameter portion 13e on the lower side of the first large diameter portion 13e. The inner diameter of the small diameter portion 13f is smaller than the inner diameter of the first large diameter portion 13e. The second large diameter portion 13g is connected to the lower end of the small diameter portion 13f on the lower side of the small diameter portion 13f. The second large diameter portion 13g is the lower end portion inside the protruding tubular portion 13c and opens to the lower side and is connected to the outer portion of the case 11. The inner diameter of the second large diameter portion 13g is larger than the inner diameter of the small diameter portion 13f. The inner diameter of the second large diameter portion 13g is, for example, the same as the inner diameter of the first large diameter portion 13e. The inner diameter of the second large diameter portion 13g may be smaller or larger than the inner diameter of the first large diameter portion 13e.

The cylindrical bush 54 extending in the axial direction is disposed inside the protruding tubular portion 13c. The bush 54 is fitted in the small diameter portion 13f and fixed in the protruding tubular portion 13c. The lower end of the bush 54 is positioned above the lower end of the small diameter portion 13f. The bush 54 has a flange portion protruding to the outside in the radial direction at the upper end portion thereof. The flange portion of the bush 54 is in contact with a step between the first large diameter portion 13e and the small diameter portion 13f from the upper side. Accordingly, exit of the bush 54 from the small diameter portion 13f to the lower side is suppressed.

The motor 20 has the motor shaft 21, a rotor 22, the stator 23, and a control unit 24. The motor shaft 21 is rotatably supported around the first central axis J1 by the first bearing 51, the second bearing 52, and the third bearing 53. The motor shaft 21 has a first shaft portion 21a, a second shaft portion 21b, and a third shaft portion 21c.

The first shaft portion 21a extends in the axial direction about the first central axis J1. The first shaft portion 21a has a rotor fixing shaft portion 21d, an upper shaft portion 21e, and a lower shaft portion 21f. The rotor 22 is fixed to the outer peripheral surface of the rotor fixing shaft portion 21d. The upper shaft portion 21e is connected to an upper end of the rotor fixing shaft portion 21d on the upper side of the rotor fixing shaft portion 21d. The upper shaft portion 21e is the upper end portion of the first shaft portion 21a and is the upper end portion of the motor shaft 21. The outer diameter of the upper shaft portion 21e is smaller than the outer diameter of the rotor fixing shaft portion 21d. The upper shaft portion 21e is supported by the third bearing 53.

The lower shaft portion 21f is connected to the lower end of the rotor fixing shaft portion 21d on the lower side of the rotor fixing shaft portion 21d. The lower shaft portion 21f is the lower end portion of the first shaft portion 21a. The outer diameter of the lower shaft portion 21f is smaller than the outer diameter of the rotor fixing shaft portion 21d and larger than the outer diameter of the upper shaft portion 21e. The outer diameter of the lower shaft portion 21f is larger than the inner diameter of an inner ring of the second bearing 52. The lower shaft portion 21f is opposed to, in the axial direction, the inner ring of the second bearing 52 on the upper side of the inner ring of the second bearing 52.

At the lower side of the first shaft portion 21a, the second shaft portion 21b extends about a second central axis J2 eccentric to the first central axis J1. The second central axis J2 is parallel to the first central axis J1. In FIG. 1, the second central axis J2 is eccentric to the left side with respect to the first central axis J1. The second shaft portion 21b is connected to the lower end of the first shaft portion 21a. The outer diameter of the second shaft portion 21b is smaller than the outer diameter of the lower shaft portion 21f. The second shaft portion 21b is supported by the second bearing 52.

The third shaft portion 21c extends in the axial direction around the first central axis J1. The third shaft portion 21c is connected to the lower end of the second shaft portion 21b on the lower side of the second shaft portion 21b. The outer diameter of the third shaft portion 21c is smaller than the outer diameter of the second shaft portion 21b. The third shaft portion 21c is the lower end portion of the motor shaft 21. The third shaft portion 21c is supported by the first bearing 51.

The rotor 22 has a cylindrical rotor core fixed to the outer peripheral surface of the rotor fixing shaft portion 21d and a magnet fixed to the outer peripheral surface of the rotor core. The stator 23 includes an annular stator core that surrounds the outside of the rotor 22 in the radial direction, and a plurality of coils that are mounted on the stator core. The stator 23 is fixed to the inner peripheral surface of the case tubular portion 12a.

The control unit 24 includes a control board 70, a second attaching member 73, a second magnet 74, a second rotation sensor 71, and a bus bar 80. The control board 70 has a plate shape expanding in a plane orthogonal to the axial direction. The control board 70 is accommodated in the control board accommodating portion 12f and fixed to the upper surface of the annular plate portion 12d. Although not illustrated, the coil of the stator 23 is electrically connected to the control board 70.

The second attaching member 73 is annular about the first central axis J1. The inner peripheral surface of the second attaching member 73 is fixed to the outer peripheral surface of the rotor fixing shaft portion 21d above the rotor 22. The outer edge portion of the second attaching member 73 in the radial direction is disposed at a position protruding upward. The outer edge portion of the second attaching member 73 in the radial direction surrounds the third bearing 53 and the bearing holding portion 12e in the radial direction. The second attaching member 73 is made of a nonmagnetic material, for example. The second attaching member 73 may be made of a magnetic material.

The second magnet 74 has an annular plate shape about the first central axis J1 and expands in a plane orthogonal to the axial direction. The second magnet 74 is fixed to the upper end surface of the outer edge portion of the second attaching member 73 in the radial direction. A method of fixing the second magnet 74 to the second attaching member 73 is not particularly limited, and, for example, the second magnet 74 is fixed with an adhesive or the like. The second attaching member 73 and the second magnet 74 rotate together with the motor shaft 21. The second magnet 74 surrounds the third bearing 53 and the bearing holding portion 12e in the radial direction and is disposed at a position overlapping the third bearing 53 in the radial direction. The second magnet 74 has an N-pole and an S-pole disposed alternately along the peripheral direction.

The second rotation sensor 71 is attached to the lower surface of the control board 70. The second rotation sensor 71 is disposed inside the hole portion penetrating the annular plate portion 12d in the axial direction. The second rotation sensor 71 faces the second magnet 74 via a gap in the axial direction. The second rotation sensor 71 detects a magnetic field generated by the second magnet 74. The second rotation sensor 71 is, for example, a Hall element. Though not illustrated, a plurality of, for example, three, second rotation sensors 71 are provided along the peripheral direction. By detecting the change in the magnetic field generated by the second magnet 74 rotating together with the motor shaft 21 using the second rotation sensor 71, the rotation of the motor shaft 21 can be detected.

The bus bar 80 is embedded and held in the connector portion 12c. One end of the bus bar 80 is fixed to the upper surface of the control board 70. The other end of the bus bar 80 is exposed to the outside of the case 11 from a recessed portion provided at an outer end portion of the connector portion 12c in the radial direction. The bus bar 80 is electrically connected to an external power supply connected to the connector portion 12c. Power is supplied from the external power supply to the coil of the stator 23 via the bus bar 80 and the control board 70.

The speed reduction mechanism 30 is disposed outside the motor shaft 21 in the radial direction at the lower side of the motor shaft 21. More specifically, the speed reduction mechanism 30 is disposed outside the second shaft portion 21b and the third shaft portion 21c in the radial direction. The speed reduction mechanism 30 is accommodated inside the speed reduction mechanism case 13. The speed reduction mechanism 30 is disposed between the lid portion 13a and the case flange portion 12b in the axial direction. The speed reduction mechanism 30 has an external gear 31, an internal gear 33, and a connecting portion 34.

Figure 2:
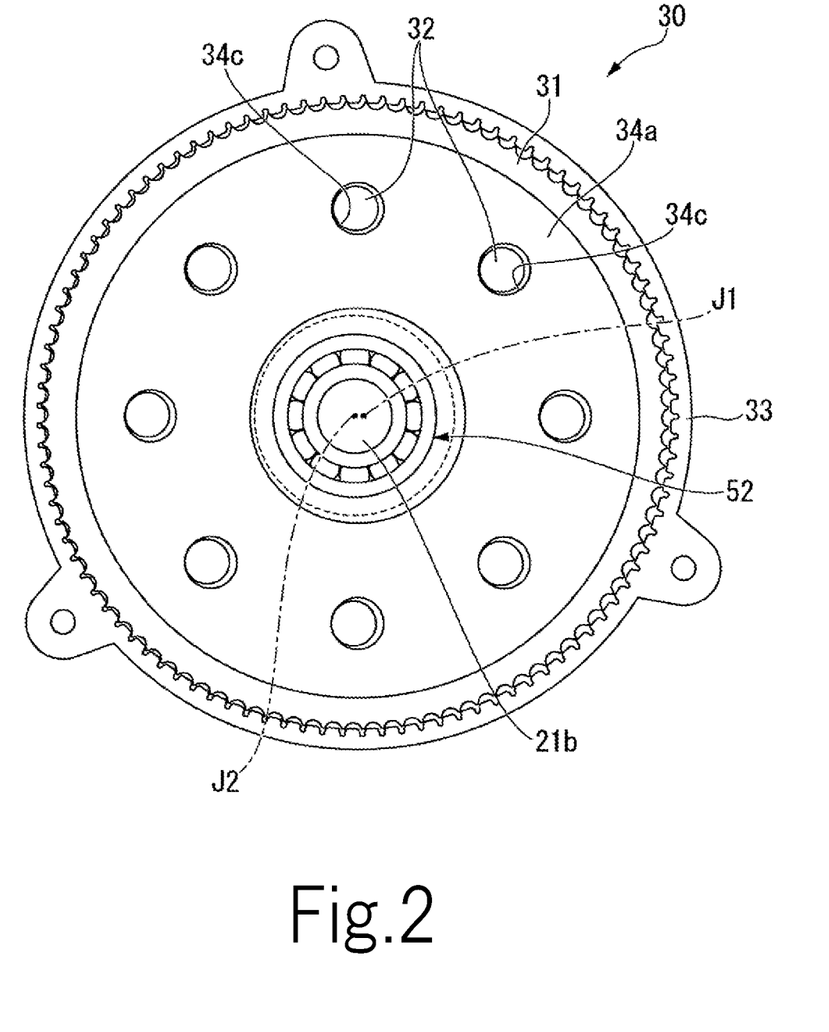
FIG. 2 is a view of a speed reduction mechanism of this embodiment, as viewed from below.

The external gear 31 has a substantially annular plate shape expanding in a plane orthogonal to the axial direction about the second central axis J2. As illustrated in FIG. 2, a gear portion is provided on the outside surface of the external gear 31 in the radial direction. As illustrated in FIGS. 1 and 2, the external gear 31 is connected to the second shaft portion 21b via the second bearing 52. In other words, the second shaft portion 21b is connected to the speed reduction mechanism 30 via the second bearing 52, and the speed reduction mechanism 30 is connected to the motor shaft 21. The external gear 31 is fitted to the outer ring of the second bearing 52 from the outside in the radial direction. Accordingly, the second bearing 52 connects the motor shaft 21 and the external gear 31 with each other to be relatively rotatable around the second central axis J2. In FIG. 2, illustration of a cylindrical portion 34b to be described below is omitted.

The external gear 31 has a plurality of pins 32. As illustrated in FIG. 1, each of the pins 32 has a columnar shape protruding downward. As illustrated in FIG. 2, the plurality of pins 32 are disposed at equal intervals through the periphery along the peripheral direction about the second central axis J2. In FIG. 2, for example, eight pins 32 are provided.

The internal gear 33 is fixed while surrounding the outside of the external gear 31 in the radial direction and meshes with the external gear 31. As illustrated in FIGS. 1 and 2, the internal gear 33 has an annular shape about the first central axis J1. As illustrated in FIG. 1, the outer edge portion of the internal gear 33 in the radial direction is disposed and fixed in a recessed portion which is provided on the inner peripheral surface of the tubular portion 13b and recessed to the outside in the radial direction. As illustrated in FIG. 2, a gear portion is provided on the inner peripheral surface of the internal gear 33. The gear portion of the internal gear 33 meshes with the gear portion of the external gear 31. More specifically, the gear portion of the internal gear 33 partially meshes with the gear portion of the external gear 31 (at left side portion in FIG. 2).

As illustrated in FIG. 1, the connecting portion 34 is disposed on the lower side of the external gear 31. The connecting portion 34 has an annular portion 34a and a cylindrical portion 34b. The annular portion 34a has an annular plate shape expanding in the radial direction about the first central axis J1. The annular portion 34a has a plurality of holes 34c penetrating the annular portion 34a in the axial direction. In other words, the connecting portion 34 has a plurality of holes 34c.

As illustrated in FIG. 2, the plurality of holes 34c are disposed at equal intervals through the periphery along the peripheral direction. In FIG. 2, for example, eight holes 34c are provided. The shape of each of the holes 34c seen along the axial direction is a circular shape. The inner diameter of the hole 34c is larger than the outer diameter of the pin 32. As illustrated in FIGS. 1 and 2, the plurality of pins 32 provided in the external gear 31 are respectively passed through the plurality of holes 34c. The outer peripheral surface of the pin 32 is inscribed in the inner peripheral surface of the hole 34c. The inner peripheral surface of the hole 34c supports the external gear 31 via the pin 32 so that the external gear 31 can swing around the first central axis J1.

As illustrated in FIG. 1, the cylindrical portion 34b has a cylindrical shape extending downward from the inner edge of the annular portion 34a. The cylindrical portion 34b includes a cylindrical portion main body 34d that has a cylindrical shape and is opened to both sides in the axial direction, and an annular bottom plate portion 34e that protrudes inward from the lower end portion of the cylindrical portion main body 34d in the radial direction and extends in the peripheral direction. The first bearing 51 is fixed to the inner peripheral surface at the upper end portion of the cylindrical portion main body 34d. The lower end portion of the cylindrical portion main body 34d and the annular bottom plate portion 34e are inserted into the first large diameter portion 13e. The lower surface of the annular bottom plate portion 34e is in contact with the upper surface of the flange portion of the bush 54. In this embodiment, the connecting portion 34 is a single member.

The output portion 40 is a portion that outputs the driving force of the electric actuator 10. The output portion 40 has the connecting portion 34 of the speed reduction mechanism 30 described above and the output shaft portion 41. As described above, the first bearing 51 for supporting the motor shaft 21 is fixed to the inner peripheral surface at the upper end portion of the cylindrical portion main body 34d of the connecting portion 34. Accordingly, the first bearing 51 connects the motor shaft 21 and the output portion 40 so as to be relatively rotatable to each other.

The output shaft portion 41 extends in the axial direction and is disposed on the lower side of the motor shaft 21. In this embodiment, the output shaft portion 41 is a multistage columnar shape about the first central axis J1. The output shaft portion 41 has a supported portion 41a, a flange portion 41b, and an attached portion 41c.

The supported portion 41a is inserted inward of the bush 54 in the radial direction. The supported portion 41a is rotatably supported by the bush 54 around the first central axis J1. The lower end of the supported portion 41a is positioned within the second large diameter portion 13g. The flange portion 41b expands outside from the upper end portion of the supported portion 41a in the radial direction. The flange portion 41b is positioned inward of the cylindrical portion main body 34d in the radial direction. The lower surface of the flange portion 41b is in contact with the upper surface of the annular bottom plate portion 34e. The attached portion 41c is connected to the lower end of the supported portion 41a on the lower side of the supported portion 41a. The attached portion 41c protrudes downward from the protruding tubular portion 13c. The other member to which the driving force of the electric actuator 10 is output is attached to the attached portion 41c.

The output shaft portion 41 is fixedly connected to the connecting portion 34. More specifically, the output shaft portion 41 is fixed to the connecting portion 34, for example, by welding the supported portion 41a or the flange portion 41b to the annular bottom plate portion 34e. Accordingly, the output shaft portion 41 is connected to the end portion of the lower side of the cylindrical portion 34b.

The output portion 40 has a first recessed portion 40a recessed from the upper side to the lower side. In this embodiment, the first recessed portion 40a is configured by the inner peripheral surface of the cylindrical portion main body 34d and the upper end surface of the output shaft portion 41. More specifically, the inside surface of the first recessed portion 40a in the radial direction is the upper portion of the inner peripheral surface of the cylindrical portion main body 34d, and the bottom surface of the lower side of the first recessed portion 40a is positioned at the upper end surface of the output shaft portion 41. In other words, in this embodiment, at least a portion of the inside surface of the first recessed portion 40a is positioned at the inside surface of the cylindrical portion 34b. As described above, in this embodiment, since the output portion 40 is configured with the connecting portion 34 and the output shaft portion 41 which are separate members from each other, the first recessed portion 40a can be likely to be provided and the output portion 40 can be likely to be made.

As described above, since the first bearing 51 is fixed to the inner peripheral surface at the upper end portion of the cylindrical portion main body 34d, the first bearing 51 is fixed to the inside surface of the first recessed portion 40a in the radial direction. In addition, the third shaft portion 21c supported by the first bearing 51, that is, the end portion of the lower side of the motor shaft 21 is accommodated in the first recessed portion 40a.

Between the bottom surface of the lower side of the first recessed portion 40a, that is, the upper end surface of the output shaft portion 41 in this embodiment and the end surface of the lower side of the motor shaft 21, that is, the lower end surface of the third shaft portion 21c in this embodiment, a gap DP is provided.

When the motor shaft 21 is rotated around the first central axis J1, the second shaft portion 21b (second central axis J2) revolves about the first central axis J1 in the peripheral direction. The revolution of the second shaft portion 21b is transmitted to the external gear 31 via the second bearing 52 and the external gear 31 is swung while the position at which the inner peripheral surface of the hole 34c and the outer peripheral surface of the pin 32 are inscribed changes. Accordingly, the position where the gear portion of the external gear 31 and the gear portion of the internal gear 33 mesh with each other changes in the peripheral direction. Therefore, the rotational force of the motor shaft 21 is transmitted to the internal gear 33 via the external gear 31.

Here, in this embodiment, since the internal gear 33 is fixed, the internal gear 33 does not rotate. Therefore, the external gear 31 rotates about the second central axis J2 by the reaction force of the rotational force transmitted to the internal gear 33. At this time, the rotating direction of the external gear 31 is opposite to the rotating direction of the motor shaft 21. The rotation of the external gear 31 around the second central axis J2 is transmitted to the connecting portion 34 via the hole 34c and the pin 32. Accordingly, the connecting portion 34 rotates around the first central axis J1, and the output portion 40 rotates around the first central axis J1. In this manner, the rotation of the motor shaft 21 is transmitted to the output shaft portion 41 via the speed reduction mechanism 30.

The rotation speed of the output portion 40 is reduced with respect to the rotation of the motor shaft 21 by the speed reduction mechanism 30. Specifically, in the configuration of the speed reduction mechanism 30 of this embodiment, the speed reduction ratio R of the rotation of the output portion 40 with respect to the rotation of the motor shaft 21 is represented by $R=-(N2-N1)/N2$. The minus sign at the head of the expression representing the speed reduction ratio R indicates that the direction of rotation of the output portion 40 of which speed is reduced is opposite to the direction in which the motor shaft 21 rotates. N1 is the number of teeth of the external gear 31 and N2 is the number of teeth of the internal gear 33. As an example, when the number of teeth N1 of the external gear 31 is 59 and the number of teeth N2 of the internal gear 33 is 60, the speed reduction ratio R is −1/60.

As described above, according to the speed reduction mechanism 30 of this embodiment, the speed reduction ratio R of the rotation of the output portion 40 with respect to the rotation of the motor shaft 21 can be made relatively large. Therefore, the rotational torque of the output portion 40 can be made relatively large.

The rotation detection device 60 detects the rotation of the output portion 40. At least a portion of the rotation detection device 60 is disposed at a position overlapping the first recessed portion 40a in the radial direction. In a case of a configuration in which the output shaft portion 41 is disposed at the one side of the motor shaft 21 in the axial direction as in the electric actuator 10 of this embodiment and connected in the axial direction, the first recessed portion 40a in which the first bearing 51 to which the output portion 40 and the motor shaft 21 are connected is inevitably provided. Therefore, by disposing at least a portion of the rotation detection device 60 so as to overlap the first recessed portion 40a in the radial direction, even if the rotation detection device 60 for detecting the rotation of the output portion 40 is provided, increase in size of the electric actuator 10 in the axial direction can be suppressed. Accordingly, the rotation detection device 60 can accurately detect the rotation of the output portion 40, and the electric actuator 10 having a structure that can suppress the increase in size thereof can be obtained.

In addition, in a case where the rotation detection device 60 is provided, by obtaining the power supply of the rotation detection device 60 from the power supply of the motor 20, one external power supply can be connected to the electric actuator 10, and the configuration of the electric actuator 10 can be simplified. Specifically, in a case of this embodiment, by obtaining the power supply of the rotation detection device 60 from the external power supply connected to the connector portion 12c, the external power supply connected to the electric actuator 10 can be made one. In this case, although it is necessary to electrically connect the rotation detection device 60 and the control unit 24 of the motor 20 to each other, as the rotation detection device 60 is disposed away from the motor 20, a wiring connecting the rotation detection device 60 and the control unit 24 to each other becomes longer, making wiring routing difficult.

On the other hand, in this embodiment, at least a portion of the rotation detection device 60 is disposed at a position overlapping, in the radial direction, the first recessed portion 40a where the first bearing 51 connecting the motor shaft 21 and the output portion 40 to each other is disposed. Therefore, for example, as compared with a case where the rotation detection device 60 overlaps the lower portion of the output shaft portion 41 in the radial direction, the rotation detection device 60 can be disposed close to the motor 20. Therefore, the wiring connecting the rotation detection device 60 and the control unit 24 to each other can be shortened, and the wiring routing can be likely to be done. Accordingly, the configuration of the electric actuator 10 can be simplified, and the electric actuator 10 can be likely to be assembled.

The rotation detection device 60 includes a circuit board 61, a first attaching member 64, a first magnet 63, and a first rotation sensor 62. A first rotation sensor 62 is attached to the circuit board 61. The circuit board 61 has a plate shape expanding in a plane orthogonal to the axial direction. In this embodiment, the circuit board 61 has an annular plate shape surrounding the outside of the cylindrical portion main body 34d in the radial direction. At least a portion of the circuit board 61 is disposed at a position overlapping the first recessed portion 40a in the radial direction. Therefore, even when the rotation detection device 60 has a configuration in which the circuit board 61 is provided as in this embodiment, increase in size of the electric actuator 10 in the axial direction can be suppressed.

In addition, by providing the circuit board 61 to which the first rotation sensor 62 is attached, the first rotation sensor 62 is likely to be disposed. In this embodiment, almost the entire circuit board 61 is disposed at a position overlapping, in the radial direction, the gap DP in the first recessed portion 40a. The lower surface of the circuit board 61 is disposed at a position overlapping the upper end portion of the output shaft portion 41, that is, the flange portion 41b in the radial direction.

The circuit board 61 is disposed in the second recessed portion 13d. Therefore, for example, compared to a case where the circuit board 61 is disposed on the upper surface of the lid portion 13a without providing the second recessed portion 13d, increase in size of the electric actuator 10 in the axial direction can be suppressed. Therefore, the size of the electric actuator 10 can be further reduced. The circuit board 61 is fixed to the bottom surface of the second recessed portion 13d. The circuit board 61 is electrically connected to the control board 70 via a wiring (not illustrated). Accordingly, the rotation detection device 60 and the control unit 24 are electrically connected to each other, and power is supplied to the rotation detection device 60 from an external power supply connected to the connector portion 12c.

The first attaching member 64 has an annular shape about the first central axis J1. The first attaching member 64 is fixed to the output portion 40. More specifically, the first attaching member 64 is fixed to the connecting portion 34. The first attaching member 64 is fitted to the outside of the cylindrical portion main body 34d in the radial direction. The upper surface of the first attaching member 64 is in contact with the lower surface of the annular portion 34a. A method of fixing the first attaching member 64 to the connecting portion 34 is not particularly limited, and, for example, the first attaching member 64 is fixed with an adhesive or the like.

The outer edge portion of the first attaching member 64 in the radial direction is disposed at a position protruding downward. The outer edge portion of the first attaching member 64 in the radial direction is disposed below the lower surface of the annular portion 34a with a space therebetween. The upper surface of the outer edge portion of the first attaching member 64 in the radial direction is positioned below the pin 32. Therefore, for example, even when the pin 32 is disposed at a position inward of the position illustrated in FIG. 1 in the radial direction, contact of the pin 32 and the first attaching member 64 with each other can be suppressed. The first attaching member 64 is made of, for example, a nonmagnetic material. The first attaching member 64 may be made of a magnetic material.

The first magnet 63 has an annular plate shape about a first central axis J1 and expanding in a plane orthogonal to the axial direction. The first magnet 63 is fixed to the lower end surface of the outer edge portion of the first attaching member 64 in the radial direction. Accordingly, the first magnet 63 is fixed to the output portion 40 via the first attaching member 64. Therefore, compared with a case where the first magnet 63 is directly fixed to the output portion 40, the first magnet 63 is likely to be fixed to the output portion 40.

In addition, as described above, by disposing the outer edge portion of the first attaching member 64 in the radial direction away from the annular portion 34a to the lower side, interference of the first magnet 63 with the pin 32 is likely to be suppressed. A method of fixing the first magnet 63 to the first attaching member 64 is not particularly limited, and, for example, the first magnet 63 is fixed with an adhesive or the like. The first attaching member 64 and the first magnet 63 rotate together with the output portion 40. The first magnet 63 has an N-pole and an S-pole disposed alternately along the peripheral direction.

In this embodiment, the first attaching member 64 and the first magnet 63 surround the outside of the first recessed portion 40a in the radial direction and are disposed at positions where the entirety of the first attaching member 64 and the first magnet 63 respectively overlap the first recessed portion 40a in the radial direction. More specifically, the first attaching member 64 and the first magnet 63 are disposed at positions overlapped with the portion of the motor shaft 21 accommodated in the first recessed portion 40a, that is, the third shaft portion 21c in the radial direction, in this embodiment. In addition, the first attaching member 64 and the first magnet 63 are disposed at positions overlapping the first bearing 51 in the radial direction. In this embodiment, the entirety of the first attaching member 64 and the first magnet 63 are respectively disposed at positions overlapping the portion of the motor shaft 21 accommodated in the first recessed portion 40a and the first bearing 51 in the radial direction.

As described above, in this embodiment, at least a portion of the rotation detection device 60 is disposed at a position overlapping the portion of the motor shaft 21 accommodated in the first recessed portion 40a or in a position overlapping the first bearing 51 in the radial direction. Therefore, the rotation detection device 60 can be disposed at a position closer to the motor 20, and the wiring connecting the rotation detection device 60 and the control unit 24 to each other can be made shorter.

In addition, by disposing at least a portion of the rotation detection device 60 at a position overlapping the first bearing 51 supporting the output portion 40 in the radial direction, the space in the axial direction necessary for supporting the output portion 40 can be used and thus the rotation detection device 60 can be disposed. Therefore, increase in size of the output portion 40 in the axial direction can be suppressed.

In addition, since the first magnet 63 has an annular shape surrounding the outside of the first bearing 51 in the radial direction, the position of the first magnet 63 in the peripheral direction is likely to be detected with high precision by the first rotation sensor 62. In addition, when the first magnet 63 is fixed to the first attaching member 64 with an adhesive or the like, the adhesion area is likely to increase and the first magnet 63 can be firmly fixed.

The first rotation sensor 62 is attached to the upper surface of the circuit board 61. The first rotation sensor 62 faces the first magnet 63 in the axial direction via a gap. The first rotation sensor 62 detects a magnetic field generated by the first magnet 63. The first rotation sensor 62 is, for example, a Hall element. Although not illustrated, a plurality of, for example, three, first rotation sensors 62 are provided along the peripheral direction. The rotation detection device 60 can detect the rotation of the output portion 40 by detecting a change in the magnetic field generated by the first magnet 63 rotating together with the output portion 40 using the first rotation sensor 62.

At least a portion of the first rotation sensor 62 is disposed at a position overlapping the first recessed portion 40a in the radial direction. For example, even in a case where the configuration of the rotation detection device 60 is minimized, a sensor such as the first rotation sensor 62 that detects rotation is an indispensable constituent element. Therefore, by disposing at least a portion of the first rotation sensor 62 so as to overlap the first recessed portion 40a in the radial direction, the electric actuator 10 can be likely to decrease the size thereof in the axial direction. In this embodiment, the entire first rotation sensor 62 is disposed at a position overlapping the first recessed portion 40a in the radial direction.

In addition, in this embodiment, at least a portion of the first rotation sensor 62 is disposed at a position overlapping the gap DP. In other words, at least a portion of the rotation detection device 60 is disposed at a position overlapping the gap DP in the radial direction. In a case where the output shaft portion 41 is disposed on one side of the motor shaft 21 in the axial direction as in the electric actuator 10 of this embodiment, it is inevitable that a gap DP is provided between the motor shaft 21 and the output shaft portion 41 in the axial direction. Therefore, by disposing at least a portion of the rotation detection device 60 so as to overlap the gap DP in the radial direction, even if the rotation detection device 60 is provided, increase in size of the electric actuator 10 in the axial direction is likely to be suppressed.

In addition, in this embodiment, since at least a portion of the first rotation sensor 62 and at least a portion of the circuit board 61 is disposed at a position overlapping the gap DP in the radial direction, increase in size of the electric actuator 10 in the axial direction is likely to be suppressed, while the circuit board 61 is provided and the first rotation sensor 62 is likely to be disposed. In this embodiment, the first rotation sensor 62 is disposed at a position where the whole of the first rotation sensor 62 overlaps the gap DP in the radial direction.

In this embodiment, the first rotation sensor 62 is disposed in the second recessed portion 13d. Therefore, as compared with a case where the first rotation sensor 62 protrudes above the second recessed portion 13d, the electric actuator 10 can be likely to decrease the size thereof in the axial direction.

The present invention is not limited to the embodiment described above, and other configurations can be adopted. The connecting portion 34 and the output shaft portion 41 may be fixed in any way as long as the connecting portion 34 and the output shaft portion 41 do not rotate relative to each other. For example, a pin or the like may be used to suppress the relative rotation between the connecting portion 34 and the output shaft portion 41, or the connecting portion 34 is provided with a hole processed into a D-shape, and an output shaft portion 41 may be inserted. In addition, the output portion 40 may be a single member, and the connecting portion 34 and the output shaft portion 41 may be respectively formed as one single member portion.

In addition, the configuration of the rotation detection device 60 is not particularly limited as long as the rotation detection device can detect the rotation of the output portion 40 and at least a portion thereof is disposed at a position overlapping the first recessed portion 40a in the radial direction. For example, the circuit board 61 may not be provided. In addition, the first rotation sensor 62 is not particularly limited as long as the first rotation sensor 62 can detect the rotation of the output portion 40, and may be a magnetoresistive element. Similarly, the second rotation sensor 71 may be a magnetoresistive element. In addition, the configuration of the speed reduction mechanism 30 is not particularly limited as long as the rotation speed of the motor shaft 21 can be reduced. In addition, the first bearing 51, the second bearing 52, and the third bearing 53 are not particularly limited as long as the first bearing 51, the second bearing 52, and the third bearing 53 can support the motor shaft 21, and may be, for example, sliding bearings or the like.

In addition, the application of the electric actuator of the present invention is not limited, and the electric actuator of the present invention may be mounted on any equipment. In addition, each of the configurations described above can be appropriately combined within a range not mutually contradictory.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator comprising:
a motor that has a motor shaft which extends in an axial direction;
a speed reduction mechanism that is disposed on an outside of a portion of the motor shaft in a radial direction at one side in the axial direction and connected to the motor shaft;
an output portion that has an output shaft portion to which rotation of the motor shaft is transmitted via the speed reduction mechanism;
a rotation detection device that detects rotation of the output portion; and
a first bearing that connects the motor shaft and the output portion to each other in a relatively rotatable manner,
wherein the output shaft portion extends in the axial direction and is disposed on the one side in the axial direction of the motor shaft,
wherein the output portion has a first recessed portion recessed from the other side in the axial direction to the one side in the axial direction,
wherein an end portion of the motor shaft on the one side in the axial direction is accommodated in the first recessed portion,
wherein the first bearing is fixed to an inside surface of the first recessed portion in the radial direction, and
wherein at least a portion of the rotation detection device is disposed at a position overlapping the first recessed portion in the radial direction.

2. The electric actuator according to claim 1,
wherein at least a portion of the rotation detection device is disposed at a position overlapping a portion of the motor shaft accommodated in the first recessed portion in the radial direction.

3. The electric actuator according to claim 1,
wherein a gap is provided between a bottom surface of the first recessed portion on the other side in the axial direction and an end surface on the one side in the axial direction of the motor shaft, and
wherein at least a portion of the rotation detection device is disposed at a position overlapping the gap in the radial direction.

4. The electric actuator according to claim 3,
wherein at least a portion of the rotation detection device is disposed at a position overlapping the first bearing in the radial direction.

5. The electric actuator according to claim 1,
wherein the rotation detection device includes
a first magnet which is fixed to the output portion, and
a first rotation sensor which faces the first magnet in the axial direction.

6. The electric actuator according to claim 5,
wherein at least a portion of the first rotation sensor is disposed at a position overlapping the first recessed portion in the radial direction.

7. The electric actuator according to claim 6,
wherein the rotation detection device has a circuit board to which the first rotation sensor is attached, and
wherein at least a portion of the circuit board is disposed at a position overlapping the first recessed portion in the radial direction.

8. The electric actuator according to claim 7, further comprising
a case that accommodates the motor and the speed reduction mechanism,
wherein the case has a lid portion which covers the speed reduction mechanism on the one side in the axial direction,
wherein the lid portion has a second recessed portion recessed from a surface of the lid portion on the other side in the axial direction to a surface of the lid portion on the one side in the axial direction, and
wherein the circuit board is disposed in the second recessed portion.

9. The electric actuator according to claim 8,
wherein the first rotation sensor is disposed in the second recessed portion.

10. The electric actuator according to claim 9,
wherein a gap is provided between a bottom surface of the first recessed portion on the other side in the axial direction and an end surface of the motor shaft on the one side in the axial direction, and
wherein at least a portion of the first rotation sensor and at least a portion of the circuit board are disposed at a position overlapping the gap in the radial direction.

11. The electric actuator according to claim 5,
wherein the first magnet has an annular shape surrounding the first bearing in the radial direction.

12. The electric actuator according to claim 5,
wherein the rotation detection device has a first attaching member which is fixed to the output portion, and
wherein the first magnet is fixed to the output portion via the first attaching member.

13. The electric actuator according to claim 1,
wherein the motor shaft includes
a first shaft portion which extends about a first central axis in an axial direction, and
a second shaft portion which extends about a second central axis eccentric to the first central axis in the axial direction, on one side in the axial direction of the first shaft portion, and is connected to the speed reduction mechanism, and
wherein the speed reduction mechanism includes
an external gear which is connected to the second shaft portion via a second bearing,
an internal gear which is fixed to surround the external gear in the radial direction and meshes with the external gear, and a connecting portion which has a plurality of holes, through which a plurality of pins provided in the external gear pass respectively, and is connected to the output shaft portion.

14. The electric actuator according to claim 13,
wherein the output portion has the connecting portion,
wherein the connecting portion includes
an annular portion which has the plurality of holes and has an annular shape expanding in the radial direction, and
a cylindrical portion which has a cylindrical shape extending from an inner edge of the annular portion to the one side in the axial direction,
wherein at least a portion of the inside surface of the first recessed portion is an inside surface of the cylindrical portion, and
wherein the output shaft portion is connected to an end portion of the cylindrical portion on the one side in the axial direction.

* * * * *